United States Patent
Xu et al.

(10) Patent No.: US 11,571,927 B2
(45) Date of Patent: Feb. 7, 2023

(54) WHEEL WITH SOUND ABSORBER

(71) Applicant: CITIC Dicastal Co., LTD, Qinhuangdao (CN)

(72) Inventors: Shiwen Xu, Qinhuangdao (CN); Mingbo Chen, Qinhuangdao (CN); Minglei Li, Qinhuangdao (CN); Shaobing Huang, Qinhuangdao (CN); Tiefeng Hu, Qinhuangdao (CN); Shuwei Feng, Qinhuangdao (CN); Dadong Wang, Qinhuangdao (CN); Weidong Liu, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 415 days.

(21) Appl. No.: 16/746,936

(22) Filed: Jan. 19, 2020

(65) Prior Publication Data

US 2021/0138832 A1 May 13, 2021

(30) Foreign Application Priority Data

Nov. 8, 2019 (CN) .......................... 201911085352.0

(51) Int. Cl.
*B60B 21/12* (2006.01)
*B60C 19/00* (2006.01)

(52) U.S. Cl.
CPC ............ *B60B 21/12* (2013.01); *B60C 19/002* (2013.01); *B60B 2900/133* (2013.01)

(58) Field of Classification Search
CPC .. B60B 21/12; B60B 2900/133; B60C 19/002
See application file for complete search history.

(56) References Cited

U.S. PATENT DOCUMENTS 11,130,366 B2 * 9/2021 Seung .................. B60C 19/002
2018/0029425 A1 * 2/2018 Nourzad .............. B60C 19/002

FOREIGN PATENT DOCUMENTS

| GB | 2536034 A | | 9/2016 |
| JP | H06106903 A | | 4/1994 |
| JP | 2006256535 A | * | 9/2006 |
| JP | 2010095103 A | * | 4/2010 |

(Continued)

OTHER PUBLICATIONS

Extended European Search Report for the corresponding EP patent application No. 20154544.9, dated Jul. 3, 2020, 8 pages.

*Primary Examiner* — Scott A Browne
(74) *Attorney, Agent, or Firm* — Yong Chen (57) ABSTRACT

The present application relates to a wheel with a sound absorber, the sound absorber being mounted in a wheel air chamber to reduce acoustic resonance, wherein the sound absorber is configured as a flat hexahedral box resonator and fastened to a wheel hub through a band, a first positioning mechanism is provided between the hub and the box resonator to fix the relative positions of the hub and the box resonator, and a second positioning mechanism is provided between the box resonator and the band to fix the relative positions of the box resonator and the band. According to the technical solution of the present disclosure, the resonator is positioned and fixed more reliably on the wheel, and the wheel is simple and economical in manufacturing, and convenient and controllable in installation and operation.

7 Claims, 4 Drawing Sheets

A-A sectional view (56) References Cited

FOREIGN PATENT DOCUMENTS

| KR | 20170067951 A | | 6/2017 | |
|----|---------------|---|--------|---|
| KR | 20170116321 A | | 10/2017 | |
| KR | 20180013177 A | | 2/2018 | |
| KR | 101893350 | * | 8/2018 | ............. B60B 21/12 |

* cited by examiner

Fig. 1

A-A sectional view

WHEEL WITH SOUND ABSORBER

CROSS-REFERENCE TO RELATED APPLICATIONS

The present application claims the priority of Chinese patent application No. 201911085352.0, filed on Nov. 8, 2019, which is hereby incorporated by reference in its entirety.

TECHNICAL FIELD

The present disclosure relates to a wheel with a sound absorber, and specifically to an automobile wheel equipped with a pneumatic tire.

BACKGROUND

During the normal driving process, the excitation of a road to a wheel and the excitation of an axle to the wheel caused by imbalance of rotation of the wheel both can excite an air chamber in the wheel to generate acoustic resonance, the resonance is transmitted to the vehicle structure through the axle and a suspension system, and noise is then radiated into the vehicle. The noise mainly has the characteristics of low frequency and narrow band, and has high magnitude, which causes noise interference to the riding environment in the vehicle and needs effective control.

At present, numerous studies and patents provide methods to effectively control such acoustic resonance. The methods mainly adopt the principle of sound absorption control, and Helmholtz resonance sound absorption has been widely applied with good effect. For example, Chinese patents CN101301842B, CN104981359B, CN105209267B, and CN104908513B. However, in the above solution known from the prior art, the structural design and mounting structure of the Helmholtz resonator are relatively complicated. Thus, the resonator component ("secondary air chamber member") is constructed with a thin flange ("edge"), a groove ("groove portion") is formed on the specially constructed wall surface of the hub, and the resonator component is positioned and fixed by engagement of the thin flange and the wall groove portion. On the one hand, the engagement mechanism is limited by the thin-walled characteristic, so it is difficult to ensure the connection strength. On the other hand, since the connection of the two parts for the component basically depends on the dimensional accuracy of the structure, high requirements are raised for the manufacturing of the component. Moreover, the alignment installation of the two parts for the component is time-consuming and laborious, and the final installation tightening force cannot be controlled.

In addition, an aluminum wheel is known from KR101822271B1, and a resonance tube is mounted along the circumferential surface of the rim in such a way that the rim has a single side wall extending along the perimeter, and buckle protrusions protruding from the center of the rim are formed on the single side wall; one side flange and the other side flange are formed on two sides of the resonance tube; the one side flange of the resonance tube is inserted into and hooked on the buckle protrusions, threads are formed on the other side flange, and the resonance tube is fixed to the circumferential surface of the rim by a matching nut member. The fixing scheme of the resonance tube has deficiencies in axial and circumferential positioning of the wheel, the fixation of the buckle protrusions and the threaded member also has the problems of unreasonable structure, high manufacturing requirement, inconvenient assembly and the like, and more importantly, the final installation tightening force is still difficult to control, and necessary protective measures to prevent loosening are lack.

Summary

The present disclosure provides a wheel with a sound absorber to overcomes the above defects in the prior art, particularly realizes more reliable positioning and fixing of the sound absorber (or a resonator) on the wheel, and is economical in manufacturing, and convenient and controllable in installation and operation.

The present disclosure is mainly based on the following idea: a box resonator with a simple shape is used to abandon the structures such as additional flanges, the structures being disadvantageous for manufacturing, storage and operation; a band (for example, made of a cheap steel band, preferably including buckles) is used as a separate fastening element to realize overall convenient installation, and the tension (then the tightening force) of the band is adjustable and controllable; and locally designed positioning mechanisms are used to ensure that the resonator is safely fixed in all directions of the wheel. The wheel assembly constructed in this way, especially resonator fixing system thereof is extremely convenient to disassemble and assemble, and is beneficial to later maintenance and replacement of spare parts, which is another advantage of the technical solution of the present disclosure.

Specifically, the present disclosure provides a wheel with a sound absorber, the sound absorber is configured as a flat hexahedral box resonator and fastened to a wheel hub through a band, a first positioning mechanism is provided between the hub and the box resonator to fix the relative positions of the hub and the box resonator, and a second positioning mechanism is provided between the box resonator and the band to fix the relative positions of the box resonator and the band.

It should be noted that the "flat hexahedral" described in the present application is not strictly limited to a geometrically regular hexahedral (for example, rectangular) shape, but is roughly a similar rectangular hexahedral shape, wherein one or more surfaces are configured to have certain radian and/or have a partially raised or sunken structure, the intersecting surfaces are not absolutely orthogonal, and the opposite surfaces are not absolutely parallel, which do not affect the implementation of the technical solution of the present disclosure.

Feasibly, in view of optimizing the overall sound absorption and noise reduction effect of the wheel and/or its dynamic balance characteristics, one box resonator is mounted on the wheel hub, or a plurality of box resonators mounted along the circumference of the hub are mounted on the wheel hub.

Advantageously, the band presses the box resonator from the top surface of the box resonator to the outer surface of a rim of the wheel hub, and fastens the box resonator around the hub, two ends of the band are fixedly connected by buckles, a circumferential pre-tightening force is thus provided for the band to fix the box resonator radially with respect to the wheel, and the band tightening force corresponding to the pre-tightening force can be adjusted and/or displayed by means of a fastening tool.

Advantageously, the first positioning mechanism comprises a first mating structure, the first mating structure being used for fixing the hub and the box resonator in the axial direction of the wheel, and a second mating structure, the second mating structure being for fixing the hub and the box resonator in the circumferential direction of the wheel.

According to a specific design, the first mating structure comprises a guide rail disposed circumferentially on the circumferential surface of the hub, and grooves formed on the bottom surface of the box resonator and corresponding to the guide rail, and the second mating structure comprises notches formed on the guide rail, and bosses corresponding to the notches in the extending paths of the grooves on the box resonator.

Preferably, the guide rail comprises two ribs circumferentially on the circumferential surface of the hub, two grooves are correspondingly formed on the bottom surface of the box resonator, one notch is respectively formed on each rib on one side of the hub, and one boss is respectively formed in the extending paths of each groove on one side of the box resonator.

The spacing between the two ribs is appropriately set such that the band disposed around the hub in the mounted state of the box resonator can be held between the surrounding ribs, thereby providing an additional positioning measure for the band, and particularly contributing to the axial positioning and fixing on the wheel relative to the wheel hub.

Advantageously, in the mounted state of the box resonator, the mounted state of the box resonator, the guide rail on one side of the hub is engaged with the groove on one side of the box resonator to fix the relative positions of the hub and the box resonator in the axial direction of the wheel, at the same time, the notch on one side of the hub is engaged with the boss on one side of the box resonator to fix the relative positions of the hub and the box resonator in the circumferential direction of the wheel, and there are gaps between bottom surfaces of the box resonator and outer surfaces of the rim of the hub.

Advantageously, the second positioning mechanism comprises a third mating structure, the third mating structure being used for fixing the box resonator and the band in the axial direction of the wheel, and a fourth mating structure, the fourth mating structure being used for fixing the box resonator and the band in the circumferential direction of the wheel.

According to a specific design, the third mating structure comprises a groove, the groove corresponding to the band and being on the top surface of the box resonator, and the fourth mating structure comprises a protrusion, the protrusion being formed on the bottom surface of the groove, and a recess, the recess corresponding to the protrusion and on the band.

Advantageously, in the mounted state of the box resonator, the band is embedded into the groove on one side of the box resonator, a side wall surface of the groove is used for fixing the relative positions of the box resonator and the band in the axial direction of the wheel, the protrusion on one side of the box resonator is engaged with the recess on one side of the band to fix the relative positions of the box resonator and the band in the circumferential direction of the wheel, and a lower surface of the band is in contact fit with the bottom surface of the groove on the box resonator.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

Figure 1:
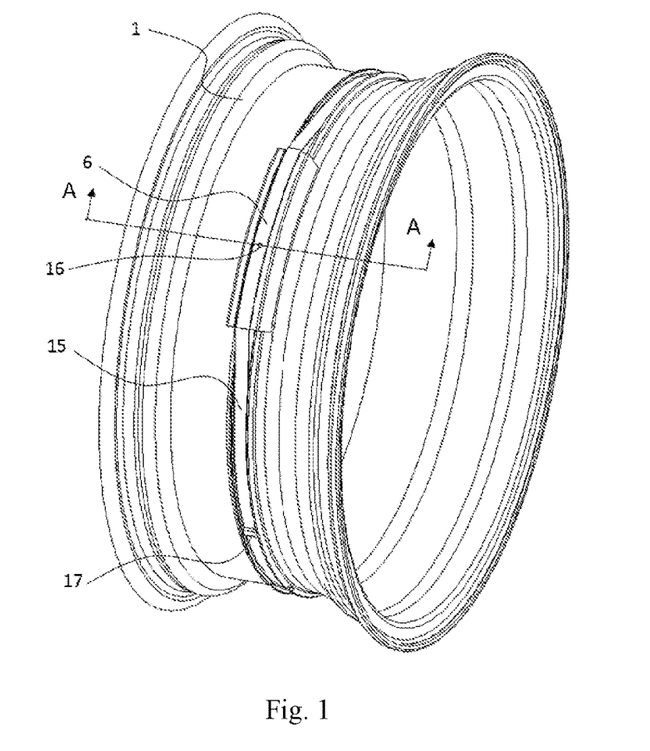
FIG. 1 is a perspective view showing a wheel of the present disclosure, including a hub and a resonator assembled thereto by a band.

The present application provides a wheel 1 with a sound absorber. As shown in FIG. 1, the wheel is particularly a vehicle wheel equipped with a pneumatic tire. For the sake of simplicity and clarity, only the constituent parts related to the design of the present disclosure are shown here. The sound absorber is mounted in a wheel air chamber to reduce acoustic resonance, wherein the sound absorber is configured as a flat hexahedral box resonator 6 and fastened to a wheel hub (or called wheel rim) by a band 15, a first positioning mechanism is provided between the hub and the box resonator 6 to fix the relative positions of the hub (or called rim) and the box resonator, and a second positioning mechanism is provided between the box resonator 6 and the band 15 to fix the relative positions of the box resonator and the band.

It is feasible to mount one box resonator 6 on the wheel hub, or to mount a plurality of box resonators 6 along the circumference of the hub on the wheel hub.

The band 15 presses, from the top surface of the box resonator 6, the box resonator to the outer surface of a rim of the wheel hub, and fastens the box resonator 6 around the hub, two ends of the band 15 are fixedly connected by buckles 17, a circumferential pre-tightening force is thus provided for the band to fix the box resonator 6 radially with respect to the wheel, and the band tightening force corresponding to the pre-tightening force can be adjusted and/or displayed by means of a fastening tool.

The first positioning mechanism includes a first mating structure for fixing the hub and the box resonator 6 in the axial direction of the wheel, and a second mating structure for fixing the hub and the box resonator 6 in the circumferential direction of the wheel.

The first mating structure includes a guide rail disposed circumferentially on the circumferential surface of the hub, and grooves formed on the bottom surface of the box resonator 6 corresponding to the guide rail, and the second mating structure includes notches formed on the guide rail, and bosses corresponding to the notches in the extending paths of the grooves on the box resonator 6.

The guide rail comprises two ribs 2, 3 circumferentially on the circumferential surface of the hub, two grooves 9, 10 are correspondingly formed on the bottom surface of the box resonator, one notch 4, 5 is respectively formed on each rib on the hub side, and bosses 11, 12 are respectively formed in the extending paths of the grooves 9, 10 on the box resonator side.

Here, the spacing between the two ribs 2, 3 is appropriately set such that the band 15 disposed around the hub in the mounted state of the box resonator 6 can be held between the surrounding ribs, thereby providing an additional positioning measure for the band, and particularly contributing to the axial positioning and fixing on the wheel relative to the wheel hub.

In the mounted state of the box resonator 6, the guide rail on the hub side is engaged with the groove on the box resonator side to fix the relative positions of the hub and the box resonator in the axial direction of the wheel, at the same time, the notch on the hub side is engaged with the boss on the box resonator side to fix the relative positions of the hub and the box resonator in the circumferential direction of the wheel, and there are gaps between bottom surfaces 14a, 14b, 14c of the box resonator 6 and outer surfaces 13a, 13b, 13c of the rim of the hub.

The second positioning mechanism includes a third mating structure for fixing the box resonator 6 and the band 15 in the axial direction of the wheel, and a fourth mating structure for fixing the box resonator 6 and the band 15 in the circumferential direction of the wheel.

The third mating structure includes a groove 7 corresponding to the band 15 and on the top surface of the box resonator, and the fourth mating structure includes a protrusion 8 formed on the bottom surface of the groove (the protrusion may be designed in the form of a stud), and a recess 16 corresponding to the protrusion and on the band (the recess may be a through hole or a blind hole).

In the mounted state of the box resonator 6, the band 15 is embedded into the groove 7 on the box resonator side, a side wall surface of the groove 7 is used for fixing the relative positions of the box resonator and the band in the axial direction of the wheel, meanwhile the protrusion 8 on the box resonator side is engaged with the recess 16 on the band side to fix the relative positions of the box resonator and the band in the circumferential direction of the wheel, and a lower surface 15a of the band 15 is in contact fit with the bottom surface of the groove 7 on the box resonator 6.

A preferred embodiment of the present disclosure is illustrated in FIGS. 1-9, and detailed design features will be described in detail below.

Figure 2:
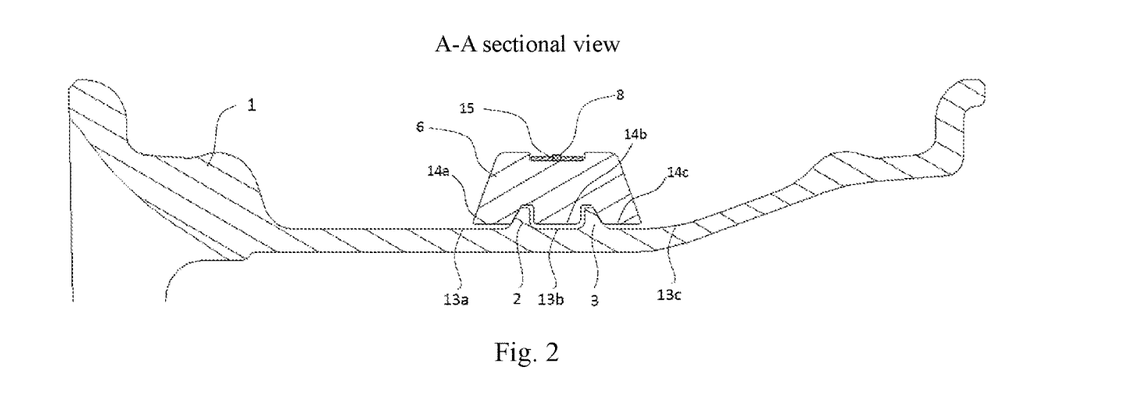
FIG. 2 is a cross-sectional view taken along line A-A of FIG. 1.
Figure 3:
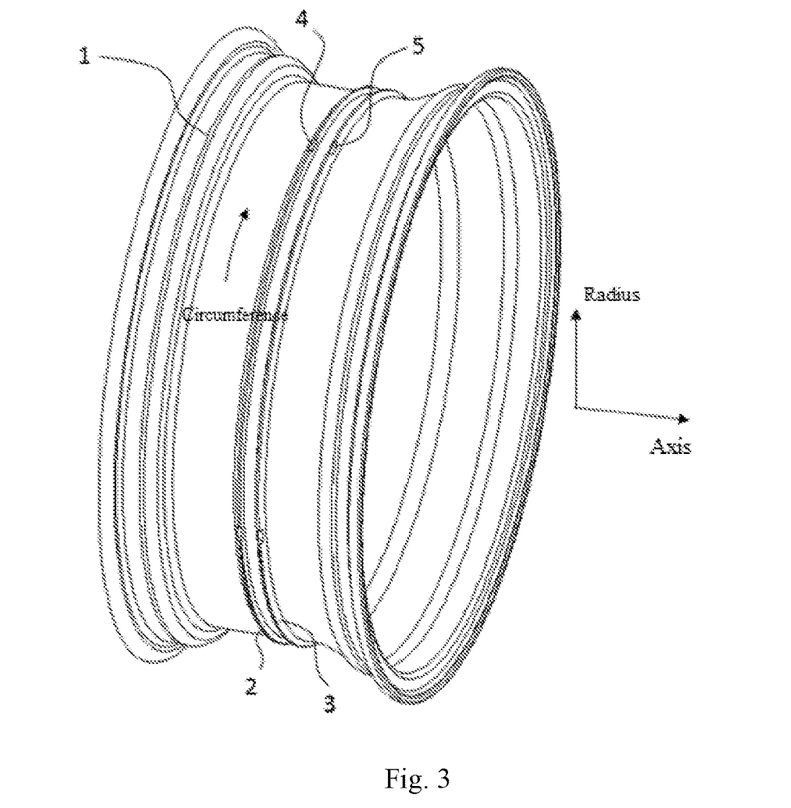
FIG. 3 is a perspective view showing a wheel hub of the present disclosure without the resonator and the band.
Figure 4:
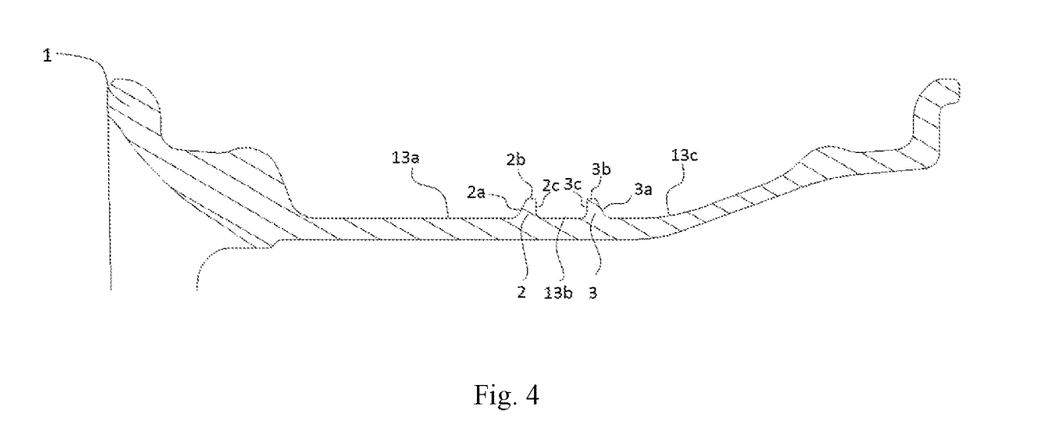
FIG. 4 is a cross-sectional view of the wheel hub in FIG. 3 taken along the radial direction.

According to the embodiment shown in the drawings, as shown in FIGS. 2-4, the wheel 1 is designed with two annular ribs 2, 3 for fixing the axial displacement of the resonator relative to the wheel, and the ribs 2, 3 are designed with resonator positioning notches 4, 5 for fixing the circumferential displacement of the resonator relative to the wheel.

Figure 6:
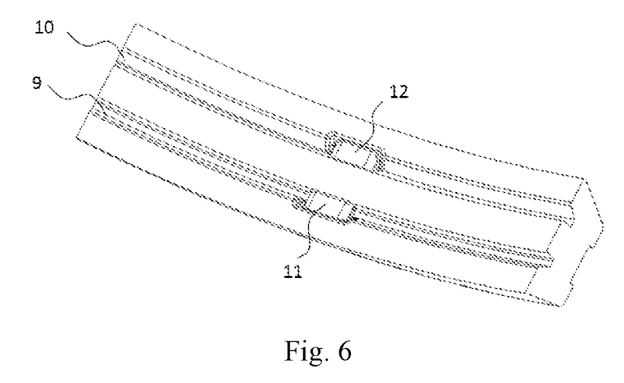
FIG. 6 is a perspective view showing the outline of the box resonator in the present disclosure, from the view the bottom surface of the box resonator can be viewed.
Figure 7:
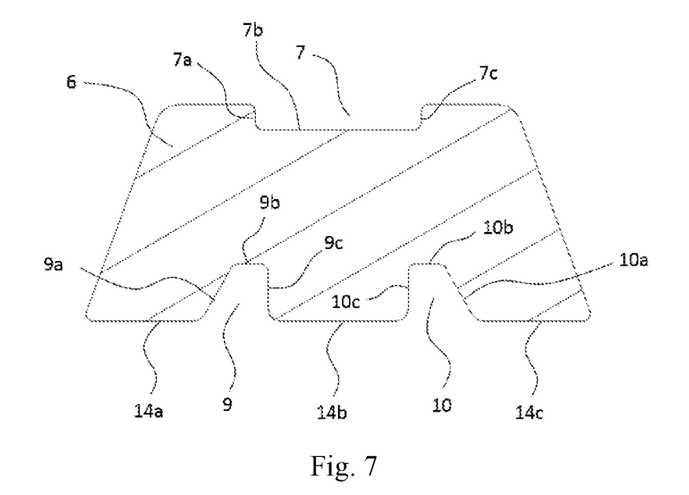
FIG. 7 is a cross-sectional view of the box resonator shown in FIG. 5 and FIG. 6.

As shown in FIG. 6 and FIG. 7, resonator positioning grooves 9, 10 are used for cooperating with the annular ribs of the wheel to fix the axial displacement of the resonator relative to the wheel, and resonator positioning bosses 11, 12 are used for cooperating with the positioning grooves 4, 5 of the wheel ribs to fix the circumferential displacement of the resonator relative to the wheel. The band 15 is used to fix the radial displacement of the resonator 6 relative to the wheel.

Figure 5:
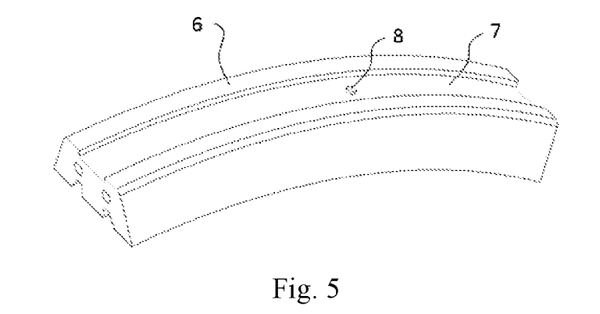
FIG. 5 is a perspective view showing the outline of a box resonator in the present disclosure, from which the top surface of the box resonator can be observed.

Particularly, as shown in FIG. 5, the resonator 6 is designed with a band groove 7 for placing the band and fixing the axial displacement of the band relative to the wheel, and the positioning boss (i.e., the protrusion 8) on the resonator cooperates with the positioning hole (i.e., the recess 16) of the band 15 to fix the circumferential displacement of the band relative to the wheel.

Particularly, as shown in FIG. 4, the rib 2 has three faces, 2a, 2b, and 2c, the faces 2a and 2c are not parallel faces, and there is certain angle between the face 2a or the face 2c and the radial direction of the wheel (as shown in the example of FIG. 4, the face 2a has an angle, specifically, the face 2a extends upward in a slope shape from the outer surface of the rim at an obtuse angle). The face 2b is an annular face with the wheel axis as a rotation axis.

Figure 8:
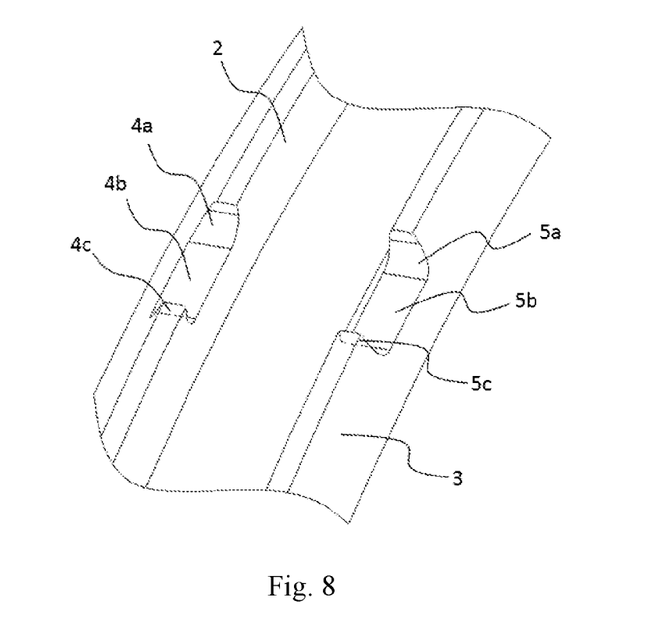
FIG. 8 is an enlarged perspective view showing a partial section of two guide rails containing notches and on the hub.

As shown in FIG. 8, the resonator positioning notch 4 on the rib 2 has three faces 4a, 4b, and 4c, and the three faces form a U-shaped notch.

Similarly, the rib 3 has three faces 3a, 3b, and 3c, the faces 3a and 3c are not parallel faces, here is certain angle between the face 3a or 3c and the radial direction of the wheel (as shown in the example of FIG. 4, the face 3a has an angle, specifically, the face 3a extends upward in a slope shape from the outer surface of the rim at an obtuse angle), and the face 3b is an annular face with the wheel axis as a rotation axis.

As shown in FIG. 8, the resonator positioning notch 5 on the rib 3 has three faces 5a, 5b, and 5c, and the three faces form a U-shaped notch.

Correspondingly, as shown in FIG. 6 and FIG. 7, the resonator positioning groove 9 has three faces 9a, 9b, and 9c, the faces 9a and 9c are not parallel faces, and here is certain angle between the face 9a or the face 9c and the radial direction of the wheel (as shown in the example of FIG. 7, the face 9a has an angle, specifically, the face 9a extends downward in a slope shape from the bottom surface 9b of the groove 9 at an obtuse angle). The face 9b is an annular face with the wheel axis as a rotation axis.

Similarly, the resonator positioning groove 10 has three faces 10a, 10b, and 10c, the faces 10a and 10c are not parallel faces, and there is certain angle between the face 10a or the face 10c and the radial direction of the wheel (as shown in the example of FIG. 7, the face 10a has an angle, specifically, the face 10a extends downward in a slope shape from the bottom surface 10b of the groove 10 at an obtuse angle). The face 10b is an annular face with the wheel axis as a rotation axis.

Figure 9:
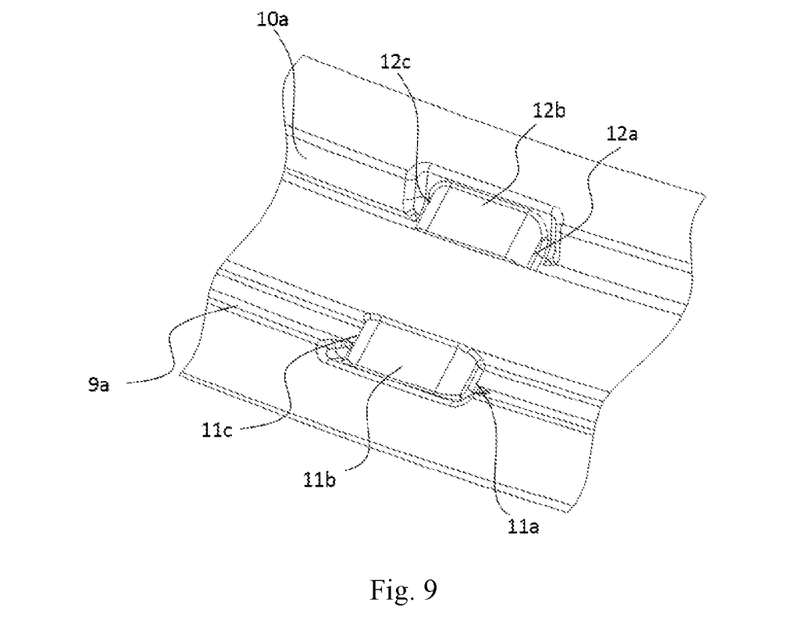
FIG. 9 is an enlarged perspective view showing a partial section of two grooves containing bosses and on the bottom surface of the box resonator.

As shown in FIG. 9, the resonator positioning boss 11 has three faces 11a, 11b, and 11c. The face 9a of the resonator positioning groove 9 is disconnected at the resonator positioning boss 11 to prevent the boss 11 from interfering with the face 9a of the resonator positioning groove 9.

Similarly, the resonator positioning boss 12 has three faces 12a, 12b, and 12c. The face 10a of the resonator positioning groove 10 is disconnected at the resonator positioning boss 12 to prevent the boss 12 from interfering with the face 10a of the resonator positioning groove 10.

As shown in FIG. 1, the band 15 and the buckles 17 constitute a radial fastening element of the resonator 6 relative to the wheel 1, the buckles 17 provide a pre-tightening force in the circumferential direction of the band 15, and the band 15 is designed with a positioning hole (i.e., the recess 16).

Referring particularly to FIG. 7, the resonator band groove 7 has three faces 7a, 7b, and 7c, and the face 7b is an annular face with the wheel axis as a rotation axis.

The face 2a of the rib 2 cooperates with 9a of the resonator positioning groove 9 to fix the axial displacement of the resonator 6 relative to the wheel 1. There is a certain gap between the face 2b of the rib 2 and face 9b of the resonator positioning groove 9. There is a certain gap between the face 2c of the rib 2 and the face 9c of the resonator positioning groove 9.

The face 3a of the rib 3 cooperates with the face 10a of the resonator positioning groove 10 to fix the axial displacement of the resonator 6 relative to the wheel 1. There is a certain gap between the face 3b of the rib 3 and the face 10b of the resonator positioning groove 10. There is a certain gap between the face 3c of the rib 3 and the face 10c of the resonator positioning groove 10, as shown in FIG. 2.

The face 4a of the resonator positioning notch 4 on the rib 2 cooperates with the face 11a of the resonator positioning boss 11, and the face 4c of the resonator positioning notch 4 on the rib 2 cooperates with the face 11c of the resonator positioning boss 11, thus fixing the circumferential displacement of the resonator 6 relative to the wheel 1. There is a certain gap between the face 4b of the resonator positioning notch 4 on the rib 2 and the face 11b of the resonator positioning boss 11.

The face 5a of the resonator positioning notch 5 on the rib 3 cooperates with the face 12a of the resonator positioning boss 12, and the face 5c of the resonator positioning notch 5 on the rib 3 cooperates with the face 12c of the resonator positioning boss 12, thus fixing the circumferential displacement of the resonator 6 relative to the wheel 1. There is a certain gap between the face 5b of the resonator positioning notch 5 on the rib 3 and the face 12b of the resonator positioning boss 12.

The face 7b of the resonator band groove 7 on the resonator 6 is in contact with the face 15a of the band 15 under the action of band fastening force to fix the radial displacement of the resonator 6 relative to the wheel 1.

The band positioning boss (i.e., the protrusion 8) on the resonator band groove 7 cooperates with the positioning hole (i.e., the recess 16) of the band 15 to fix the circumferential displacement of the band 15 relative to the wheel 1 and the resonator 6.

The faces 7a and 7c on the resonator band groove 7 are used for fixing the axial displacement of the band 15 relative to the wheel 1 and the resonator 6.

The radial displacement of the band 15 relative to the wheel 1 and the resonator 6 is fixed through the pre-tightening force of the buckles 17.

There are certain gaps between the bottom surfaces 14a, 14b, 14c of the resonator 6 and the outer surfaces 13a, 13b, 13c of the rim.

The lower surface 15a of the band 15 is in contact fit with the face 7b of the resonator band groove 7.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. A wheel with a sound absorber, the sound absorber being mounted in a wheel air chamber to reduce acoustic resonance, wherein the sound absorber is configured as a flat hexahedral box resonator and fastened to a wheel rim through a band, a first positioning mechanism is provided between the wheel rim and the box resonator to fix the relative positions of the wheel rim and the box resonator, and a second positioning mechanism is provided between the box resonator and the band to fix the relative positions of the box resonator and the band;

wherein the first positioning mechanism comprises a first mating structure, the first mating structure being used for fixing the wheel rim and the box resonator in the axial direction of the wheel, and a second mating structure, the second mating structure being for fixing the wheel rim and the box resonator in the circumferential direction of the wheel;

wherein the first mating structure comprises a guide rail disposed circumferentially on the circumferential surface of the wheel rim, and grooves formed on the bottom surface of the box resonator and corresponding to the guide rail, and the second mating structure comprises notches formed on the guide rail, and bosses corresponding to the notches in the extending paths of the grooves on the box resonator; and wherein the guide rail comprises two ribs circumferentially on the circumferential surface of the wheel rim, two grooves are correspondingly formed on the bottom surface of the box resonator, one notch is respectively formed on each rib on the wheel rim side, and one boss is respectively formed in the extending paths of each groove on the box resonator side.

2. The wheel according to claim 1, wherein one box resonator is mounted on the wheel rim, or a plurality of box resonators mounted along the circumference of the wheel rim are mounted on the wheel rim.

3. The wheel according to claim 1, wherein the band presses the box resonator from the top surface of the box resonator to a rim outer surface of the wheel rim, and fastens the box resonator around the wheel rim, two ends of the band are fixedly connected by buckles, a circumferential pre-tightening force is thus provided for the band to fix the box resonator radially with respect to the wheel.

4. The wheel according to claim 1, wherein in the mounted state of the box resonator, the guide rail on the wheel rim side is engaged with the groove on the box resonator side to fix the relative positions of the wheel rim and the box resonator in the axial direction of the wheel, at the same time, the notch on the wheel rim side is engaged with the boss on the box resonator side to fix the relative positions of the wheel rim and the box resonator in the circumferential direction of the wheel, and there are gaps between bottom surfaces of the box resonator and outer surfaces of the rim of the wheel rim.

5. The wheel according to claim 1, wherein the second positioning mechanism comprises a third mating structure, the third mating structure being used for fixing the box resonator and the band in the axial direction of the wheel, and a fourth mating structure, the fourth mating structure being used for fixing the box resonator and the band in the circumferential direction of the wheel.

6. The wheel according to claim 5, wherein the third mating structure comprises a groove, the groove corresponding to the band and being on the top surface of the box resonator, and the fourth mating structure comprises a protrusion, the protrusion being formed on the bottom surface of the groove, and a recess, the recess corresponding to the protrusion and on the band.

7. The wheel according to claim 6, wherein in the mounted state of the box resonator, the band is embedded into the groove on the box resonator side, a side wall surface of the groove is used for fixing the relative positions of the box resonator and the band in the axial direction of the wheel, the protrusion on the box resonator side is engaged with the recess on the band side to fix the relative positions of the box resonator and the band in the circumferential direction of the wheel, and a lower surface of the band is in contact fit with the bottom surface of the groove on the box resonator.

\* \* \* \* \*